May 3, 1955 — J. F. SNEED — 2,707,347
FISHING FLOAT OR BOBBER
Filed April 30, 1954 — 2 Sheets-Sheet 2

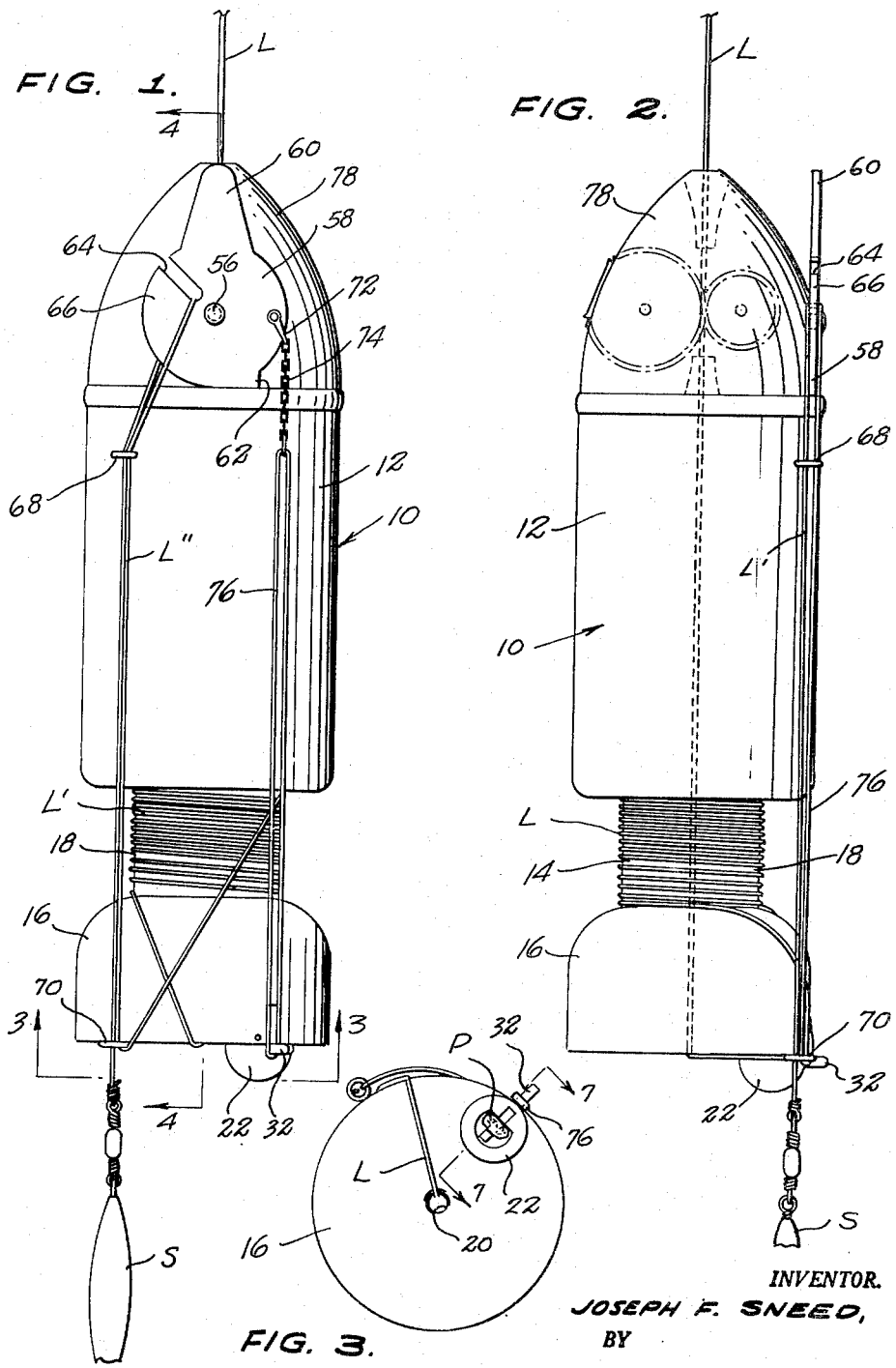

INVENTOR.
JOSEPH F. SNEED,
BY
McMorrow, Berman & Davidson
ATTORNEYS.

United States Patent Office 2,707,347
Patented May 3, 1955

2,707,347

FISHING FLOAT OR BOBBER

Joseph F. Sneed, Sunflower, Kans.

Application April 30, 1954, Serial No. 426,633

4 Claims. (Cl. 43—43.11)

This invention relates to a fishing float or bobber and has for its primary object to facilitate the casting of a fishing line while enabling the fisherman to dispose his fish hook at a selected distance below the bobber.

Another object is to move a bobber or float along the fishing line and to secure it at a selected position with relation to the sinker carried thereby and to support the length of line between the bobber and the sinker in convolutions about the bobber so that the line may be cast without interference of the length of line between the bobber and the sinker.

The above and other objects may be attained by employing this invention which embodies among its features a buoyant body having a guide for receiving a fishing line carrying a sinker, a line clamp carried by the body and releasably engaging the fishing line intermediate the ends thereof for securing the body to the line at a selected distance from the sinker, means carried by the body for supporting in successive convolutions a length of the line between the body and the sinker, and means carried by the body and engaging the fishing line adjacent the sinker for releasably holding the length of line in the successive convolutions and the sinker adjacent the float during the casting of the fishing line.

Other features include an anvil carried by the body adjacent a fishing line received in the line guide, and a clamp shoe mounted adjacent the anvil on the side of the fishing line remote from the anvil for engaging said fishing line and clamping it against the anvil.

Other features include a spool carried by the buoyant body and extending longitudinally therefrom for supporting in successive convolutions a length of the line between the body and the sinker and rocking means carried by the body and engaging the fishing line adjacent the sinker for releasably holding the length of line in the successive convolutions and the sinker adjacent the body during the casting of the fishing line, and soluble pellet released means carried by the body and operatively connected to the rocking means for releasing the rocking means when the pellet dissolves so as to permit the sinker to descend and unwind the convolutions from the spool.

Still other features include a trigger carried by the body and movable relative thereto from an active position in which it extends outwardly from the body to an inactive position in which it lies wholly within the periphery of the body, water soluble means carried by the body and engaging the trigger to hold it projected, and extensible means carried by the keeper disk and connected to the trigger for release thereby upon dissolution of the soluble means.

In the drawings:

Figure 1 is a side view of a fishing float or bobber embodying the features of this invention;

Figure 2 is a view similar to Figure 1, taken at right angles thereto;

Figure 3 is a bottom plan view of the fishing float or bobber;

Figure 4:
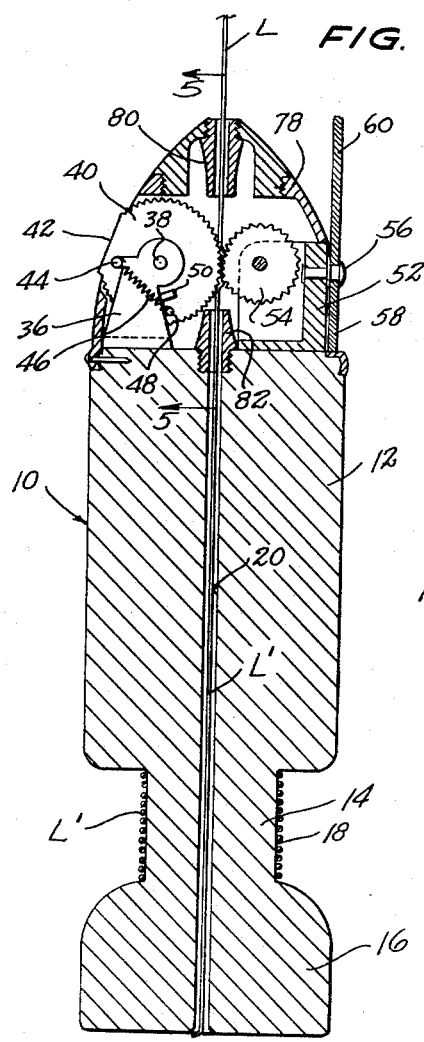
Figure 4 is a longitudinal sectional view through the fishing float or bobber.
Figure 5:
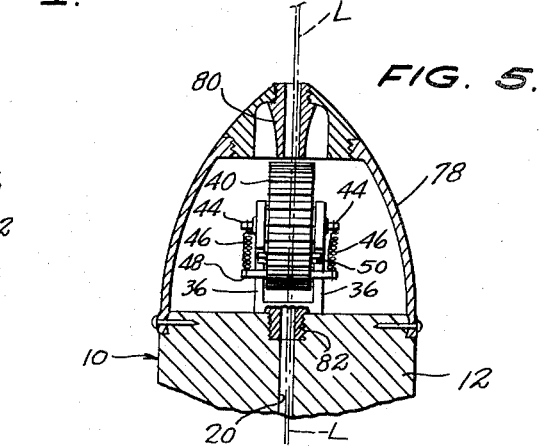
Figure 5 is a fragmentary sectional view similar to Figure 4, taken substantially on the line 5—5 of Figure 4.

Referring to the drawings in detail, this improved bobber designated generally 10 comprises a buoyant body 12 carrying adjacent one end a longitudinally extending portion 14 of lesser diameter than the body which in turn is provided adjacent its end remote from the body with an outwardly extending annular flange 16 which defines with the body a spool 18 upon which a portion of the fishing line, to be more fully hereinafter described, is wound. Extending longitudinally through the body along the axis thereof is a bore 20 which defines a guide through which passes a fishing line L carrying adjacent one end a conventional sinker S, while the opposite end of the fishing line L is coupled in any suitable manner to a casting pole or rod (not shown).

Carried by the flange 16 and extending outwardly therefrom adjacent the end thereof remote from the spool 18 is a guard 22 having a recess 24 extending thereinto through the end thereof remote from the flange 16, and opening through one side of the flange 16 adjacent the guard 22 is a recess 26 which communicates with a slot 28 which opens through the guard 22 and communicates with the recess 24 therein. Pivotally supported as at 30 is a trigger 32 carrying a laterally projecting arm 34 which moves in unison with the trigger in an arcuate path which extends through the slot 28 and the recess 24 from an active position in which the trigger extends outwardly beyond the peripheral confine of the flange 16 to an inactive position in which the trigger lies wholly within the recess 26 and the arm 34 lies wholly within the slot 28. Carried by and extending outwardly from the end of the body 12 remote from the core 14 are spaced parallel ears 36 carrying adjacent their upper ends a spindle 38 which extends between the ears 36 for rotatably supporting a peripherally toothed clutch wheel 40 having a flat 42 on its periphery, the purpose of which will hereinafter appear. Carried by and extending outwardly from the ears 36 adjacent their upper ends are lugs 44 to each of which is connected a retractile coil spring 46, the opposite end of which is connected to a cross pin 48 carried by and extending transversely through the clutch wheel 40 remote from the flat 42. A stop 50 is carried by the clutch wheel 40 and extends laterally outwardly therefrom adjacent the cross pin 48 for engagement with the ears 36 to arrest movement of the clutch wheel 40 beyond a predetermined distance in which the toothed periphery thereof intersects the path of movement of the fishing line L through the guide passage 20.

Carried by and extending outwardly from the end of the body 12 carrying the ears 36 in spaced relation thereto and on the side of the passage 20 remote from the ears 36 is a bracket 52 carrying a peripherally toothed anvil 54 which, as illustrated in Figure 4, is adapted to cooperate with the clutch wheel 40 in engaging the fishing line L and holding it against movement relative to the bobber or float 10. It will thus be seen that the springs 46 will hold the toothed periphery of the clutch wheel 40 in frictional engagement with the fishing line L and against the anvil 54 until such time as the flat 42 is moved by rotation of the clutch wheel 40 against the effort of the springs 46 into a position in which the fishing line L is released to enable the bobber to be moved freely therealong to a selected position relative to the sinker S.

Mounted for rocking movement on the bracket 52 about a pivot pin 56 adjacent the end of the body 12 on the side thereof remote from the clutch wheel 40 is a disk 58 carrying a radially projecting arm 60 and diametrically opposite said arm a stop 62 which engages the adjacent end of the body 12 and arrests rotation of the disk 58 in one direction. Extending through the disk 58 and opening through the periphery thereof adjacent the lever 60 is a radial slot 64 defining a hook 66, the purpose of which will hereinafter appear. Carried by the body 12 and flange 16 and extending outwardly therefrom adjacent one side thereof are longitudinally spaced guide eyes 68 and 70, respectively. Connected to the disk 58 adjacent the periphery thereof on the side of the pivot 56 remote from the slot 64 is a loop 72 to which is connected one end of a flexible member 74 carrying a looped extensible elastic member 76 which, as illustrated in the drawings, is adapted to be extended downwardly adjacent the side of the body 10 and flange 16 and looped about the trigger 32, as will be readily understood upon reference to the drawings. It will thus be seen that when the trigger 32 moves into the recess 26 in the flange 16, the extensible member 76 will be released to enable the disk 58 to rotate in a counterclockwise direction when viewed in Figure 1 to dispose the slot 64 in a downwardly and outwardly inclined position and enable the length L' of the line L to disengage itself from the hook 66.

A suitable cap 78 is removably coupled to the body 12 in enclosing relation with the clutch wheels 40 and 54 and carried by said cap and projecting into the interior thereof in axial alignment with the bore 20 is a guide nipple 80 which aligns axially with a guide nipple 82 carried by the body 12 in alignment with the opening 20.

Figure 7:
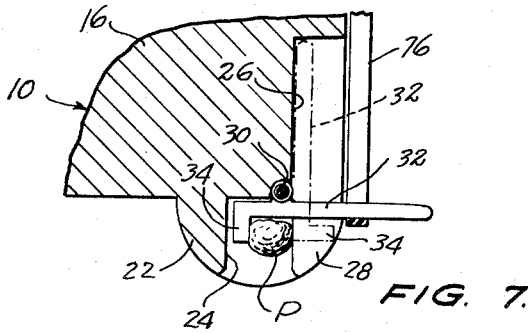
Figure 7 is a sectional view taken substantially on the line 7—7 of Figure 6.
Figure 6:
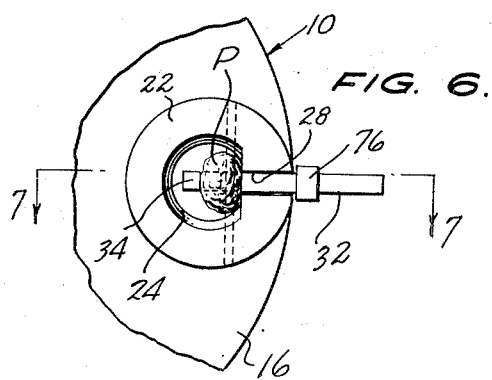
Figure 6 is an enlarged fragmentary bottom plan view on an enlarged scale of the bobber or float showing the trigger in active position.

In use, the clutch wheel 40 is rotated about its axle 38 against the effort of the springs 46 to bring the flat 42 adjacent the anvil 54 to free the line L and permit adjustment of the float or bobber 10 to a selected position on the line L with relation to the sinker S. When the float or bobber 10 has been located on the line L at a selected distance from the sinker S, the clutch wheel 40 is rotated to cause the peripheral teeth to engage the line L and clamp it against the anvil 54 to lock the bobber or float in the selected position. A portion of the length of line L' is wound in successive convolutions about the spool 18 and a relatively short length L'' of the line between the convolutions L' thereof and the sinker S is formed into a loop and passed upwardly through the eyes 70 and 68 to engage the hook 66 of the disk 58. With the trigger 32 being held outwardly in extended position, as illustrated in Figures 6 and 7, by the insertion of a soluble pellet P between the arm 34 and the wall of the recess 24 adjacent the slot 28 the elastic loop 76 is engaged with the trigger 32 to hold the disk 58 against rotation under the influence of the sinker S.

With the float or bobber thus set, the line L may be reeled in until the float or bobber 10 lies adjacent the end of the fishpole and upon casting the line in the usual manner, no conflict of the sinker and hooks carried by the line with surrounding shrubbery will be experienced. At the same time after the line has been cast, the soluble pellet P will melt and permit the elastic loop 76 to slip off of the trigger 32 as it moves upwardly under the influence of the elastic loop so as to release the disk 58 and permit it to rotate about the pivot 56 under the influence of the weight of the sinker S until such time as the loop L'' is disengaged from the hook 66, whereupon the sinker in falling through the water will cause the length of line L' wound upon the spool 18 to unwind so that fishing may progress at a selected depth beneath the bobber or float 10. Obviously, after returning the line to the fishing pole, the length of line L' and L'' will slip through the clutch wheels 40 and 56 when movement of the bobber or float 10 is arrested by contact with an eye carried by the fishing pole so that the entire length of line may be wound on the reel carried by the pole. This will enable the user to readjust the position of the float or bobber 10 on the line L so that fishing may progress at a selected distance below the bobber or float and by rewinding the length L' of the line about the spool 18 and resetting the device, as previously described, the fishing may progress at a selected depth below the surface of the water.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A fishing float or bobber comprising a buoyant body having a guide for receiving a fishing line carrying a sinker, a line clamp carried by the body and releasably engaging the fishing line intermediate the ends thereof for securing the body to the line at a selected distance from the sinker, the body having a portion forming a spool for supporting in successive convolutions a length of the line between the body and the sinker, means carried by the body and engaging the fishing line adjacent the sinker for releasably holding the length of the line in the successive convolutions and the sinker adjacent the float during casting of the fishing line, rocking means carried by the body and engaging the fishing line adjacent the sinker for releasably holding the length of the line in the successive convolutions and the sinker adjacent the body during the casting of the fishing line, and soluble pellet released means carried by the body and operatively connected to the rocking means for releasing the rocking means when the pellet dissolves and permitting the sinker to descend and unwind the convolutions from the spool.

2. The structure defined in claim 1 in which the rocking means comprises a keeper disk mounted on the body to rock about an axis which intersects and lies perpendicular to the longitudinal axis of the body, said disk having a fishing line receiving slot extending therethrough and opening through the periphery thereof, and yielding means carried by the keeper disk and releasably connected to the body for holding the keeper disk against rotation under the influence of the sinker on the fishing line.

3. The structure defined in claim 1 in which the rocking means comprises a keeper disk mounted on the body to rock about an axis which intersects and lies perpendicular to the longitudinal axis of the body, said disk having a fishing line receiving slot extending therethrough and opening through the periphery thereof, a trigger carried by the body and movable relative thereto from an active position in which it projects outwardly therefrom to an inactive position in which it lies wholly within the periphery of said body, water soluble means carried by the body and engaging the trigger to hold it projected, and extensible means carried by the keeper disk and connected to the trigger for release thereby upon dissolution of the soluble means.

4. In fishing equipment a fishing line carrying a sinker, a buoyant body mounted on said fishing line for movement longitudinally thereon, means carried by the body and engaging the fishing line for securing the body to the line in a selected position thereon, the body having a portion forming a spool for supporting in successive convolutions a length of the fishing line between the body and the sinker, releasable means carried by the body for engaging the fishing line adjacent the sinker and releasably holding said fishing line in the successive convolutions and the sinker adjacent the body during the casting of the line, and water soluble means operatively connected to the releasable means for releasing the releasable means and allowing the sinker to fall away from the body and the line to unwind from the spool portion thereof.

References Cited in the file of this patent

UNITED STATES PATENTS

| | | |
|---|---|---|
| 170,628 | Hofele | Nov. 30, 1875 |
| 1,206,613 | Teeling | Nov. 28, 1916 |
| 1,520,716 | Judd | Dec. 30, 1924 |
| 2,041,322 | Cantini | May 19, 1936 |
| 2,479,642 | Schiffmann | Aug. 23, 1949 |
| 2,607,154 | Martens | Aug. 19, 1952 |